(12) United States Patent
Silberberg et al.

(10) Patent No.: US 6,327,068 B1
(45) Date of Patent: Dec. 4, 2001

(54) ADAPTIVE PULSE COMPRESSOR

(75) Inventors: Yaron Silberberg, Rehovot; Doron Meshulach, Ramat Gan; Dvir Yelin, Kibbutz Merom Golan, all of (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 09/085,293

(22) Filed: May 27, 1998

(51) Int. Cl.$^7$ .................................................. G02B 26/00
(52) U.S. Cl. .................... 359/239; 359/244; 359/247; 372/25
(58) Field of Search .................................. 359/239, 244, 359/247; 372/25, 96, 6

(56) References Cited

U.S. PATENT DOCUMENTS

| | | | |
|---|---|---|---|
| 3,611,182 | * 10/1971 | Treacy | 331/94.5 |
| 4,477,905 | * 10/1984 | Sweeney | 372/25 |
| 4,999,840 | * 3/1991 | Negus | 372/18 |
| 5,077,619 | * 12/1991 | Toms | 359/187 |
| 5,541,947 | * 7/1996 | Mourou et al. | 372/25 |
| 6,080,148 | * 6/2000 | Damasco et al. | 606/10 |

OTHER PUBLICATIONS

Meshulach, D. et al., "Adaptive Real–time Femtosecond Pulse Shaping", Journal of Opt. Soc. America–B, May 1998, vol. 15, p. 1615.

Meshulach, D. et al., "Adaptive Compression of Femtosecond Pulses", presented at the Ultrafast Optics 1997 Conference, Aug. 1997, Monterey, California.

C.W. Hillegas, et al., "Femtosecond Laser Pulse Shaping by Use of Microsecond Radio Frequency Pulses", Optics Letters, vol. 19, No. 10 (1994) pp. 737–739.

Baumert et al., "Femtosecond Pulse Shaping by an Evolutionary Algorithm with Feedback", Published in Applied Physics B, vol. 63, pp. 779–782 (1997).

M.M. Wefers, et al., "Generation of high–fidelity programmable ultrafast optical waveforms." Optics Letters, vol. 20, No. 9 (1995) pp. 1047–1049.

F. Krausz, et al., "Generation of 33 FS Pulses from a Solid State Laser", Published in Optics Letters, vol. 17, p. 204–206, No. 3 (1992).

A.M. Weiner, et al., "Encoding and Decoding of Femtosecond Pulses", Optics Letters, vol. 13, No. 4, pp. 300–302 (1988).

Warren S. Warren, et al., "Coherent Control of Quantum Dynamics: The Dream is Alive", Science, vol. 259, pp. 1581–1589 (1993).

Christian Spielman, et al., "TI: Sapphire Laser Produces Intense Sub–5–FS Pulses", Laser Focus World, pp. 127–135 (1997).

Michael D. Perry, et al., "Terawatt to Petawatt Subpicosecond Lasers", Science, vol. 264, pp. 917–923 (1994).

(List continued on next page.)

Primary Examiner—Georgia Epps
Assistant Examiner—Tim Thompson
(74) Attorney, Agent, or Firm—Ladas & Parry

(57) ABSTRACT

An adaptive pulse compressor is described, especially for use with ultrashort pulses, wherein the input pulses are modified in an iterative fashion, according to a feedback signal obtained from measurement of the output pulses. The feedback signal is programmed, by means of a programmable spatial light modulator, to allow for independent control of the individual spectral components of the incoming pulses, such that almost arbitrary phase functions can be realized to accomplish efficient compression. One of the main disadvantages associated with prior art pulse compressors, namely, the need for characterization of the uncompressed pulses, is thus eliminated. The compressor is thus capable of handling completely uncharacterized or from time varying sources.

19 Claims, 6 Drawing Sheets

OTHER PUBLICATIONS

Brochure: "Shape Your Pulses, Control Your Experiment", CRI, Inc., Laser Focus World, (Dec. 1997) p. 26.

D. Meshulach, et al., "Adaptive Ultrashort Pulse Compression and Shaping", Published in Optics Communications, vol. 138, pp. 345–348 (Jun. 1997).

D. Yelin et al., "Adaptive Femtosecond Pulse Compression", Published in Optics Letters, vol. 22, pp. 1793–1795 (Dec. 1997) No. 23.

R.S. Judson, et al., "Teaching Lasers to Control Molecules", Published in Physical Review Letters, vol. 68, No. 10 (1992) pp. 1500–1503.

A.M. Weiner, "Femtosecond Optical Pulse Shaping and Processing", Published in Progress in Quantum Electronics, vol. 19, pp. 161 (1995).

A.M. Weiner et al. "Programmable femtosecond pulse shaping by use of a multi–element liquid–crystal phase modulator." Optics Letters, vol. 15, No. 6 (1990) pp. 326–328.

A.M. Weiner et al. "Programmable Shaping of Femtosecond Optical Pulses by Use of 128–Element Liquid Crystal Phase Modulator." IEEE Journal of Quantum Electronics, vol. 28, No. 4, (1992) pp. 908–919.

R.L. Fork, et al., "Compression of Optical Pulses to Six Femtoseconds by Using Cubic Phase Compensation", Published in Optics Letters, vol. 12, p. 483–485 (1987), No. 7.

R. Szipocs, et al., "Chirped Multilayer Coatings for Broadband Dispresion Control in Femtosecond Lasers", Which appeard in Optics Letters, vol. 19, No. 3 (1994) pp. 201–203.

M. Nisoli, et al., "Compression of High–Energy Laser Pulses Below 5FS", Published in Optics Letters, vol. 22, No. 8 (1997) pp. 522–524.

* cited by examiner

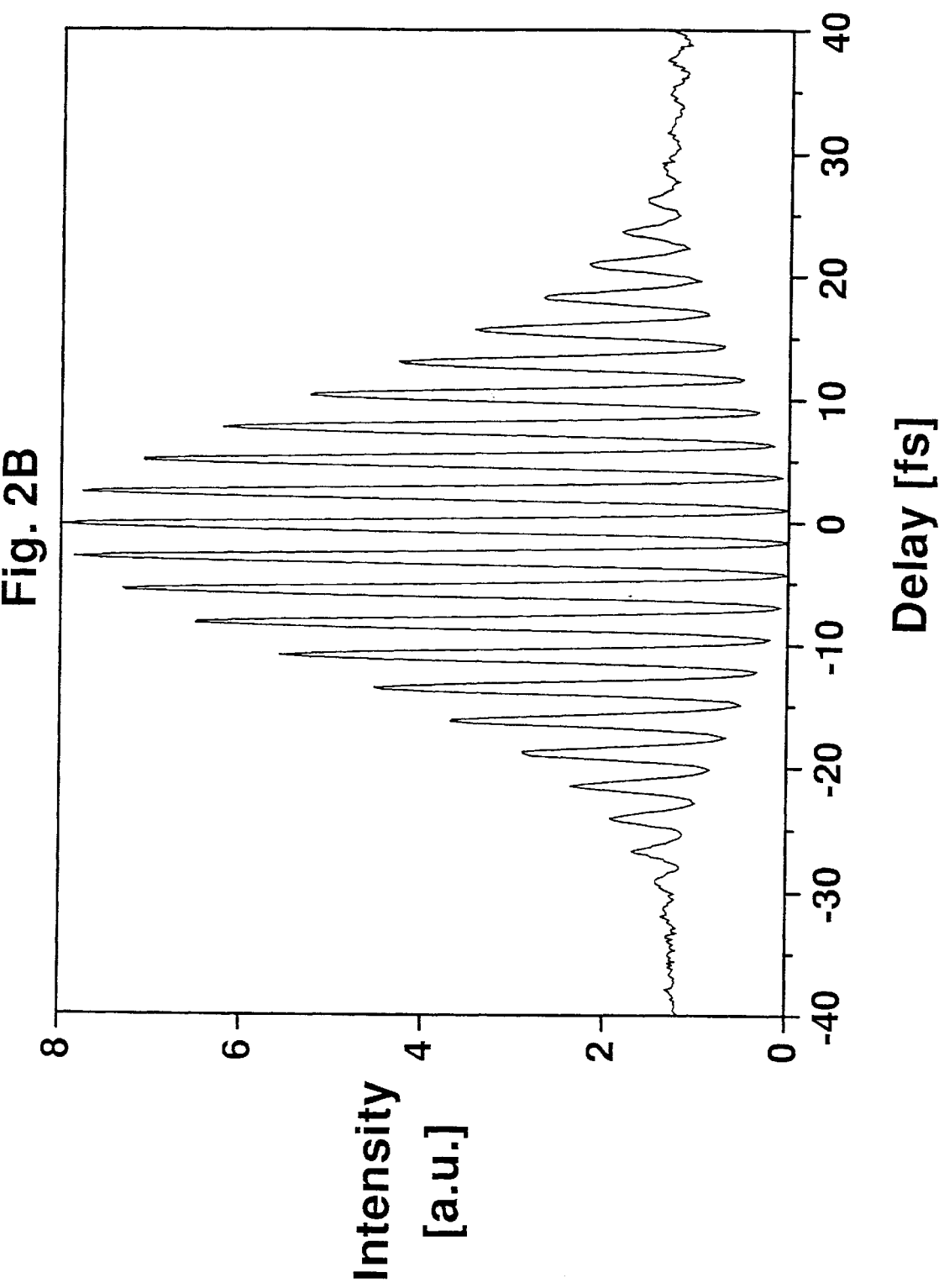

ADAPTIVE PULSE COMPRESSOR

FIELD OF THE INVENTION

The present invention relates to the field of compression of ultrashort optical pulses.

BACKGROUND OF THE INVENTION

Since the invention of mode-locked lasers, considerable effort has been directed towards the generation of ultrashort optical pulses. Novel techniques for broad-band dispersion control now enable self-mode-locked Ti:Sapphire lasers to directly produce 6.5 femtosecond pulses. Compression of pulses down to sub-5 fs is achievable by treating the outputs of such lasers with novel spectral broadening techniques in external pulse compressors. Efficient pulse compression generally requires characterization of the pulses. Grating-pair or prism-pair compressors are commonly used to compensate mainly for second order dispersion, while a combination of these allows for simultaneous compensation for the second and the third orders, as described, for instance in an article by R. L. Fork, C. H. B. Cruz, P. C. Becker and C. V. Shank, entitled "Compression of optical pulses to six femtoseconds by using cubic phase compensation" published in Optics Letters, Vol. 12, p. 483 (1987). More recently, chirped dielectric mirrors, tailored to produce negative group velocity dispersion over a wide spectrum, have been described by R. Szipöcs, K. Ferencz, C. H. Spielmann, and F. Krausz, in the article entitled "Chirped multilayer coating for broadband dispersion control in femtosecond lasers" which appeared in Optics Letters, Vol. 19, p. 201 (1994). Such chirped mirrors have been used to compress pulses down to durations of sub-5 fs, as described in the article entitled "Compression of high-energy laser pulses below 5 fs ." by M. Nisoli, S. De Silvestri, O. Svelto, R. Szipöcs, K. Ferencz, Ch. Spielmann, S. Sartania, and F. Krausz, published in Optics Letters, Vol. 22, p. 522 (1997).

However, in cases where the pulses are uncharacterized, or when the spectral phase cannot be approximated by the leading few terms of the corresponding Taylor expansion, these techniques for pulse compression cannot be used efficiently, since the spectral transfer function needed to form the desired output pulse cannot be calculated. A specific spectral transfer function corresponds to a specific complex input pulse spectrum. Consequently, compression of arbitrary uncharacterized pulses down to the minimum time-bandwidth product cannot be accomplished by these prior art methods since the relative phases between the spectral components of the input pulses are not known.

Furthermore, practical considerations limit the use of such techniques to situations where the pulse source is substantially constant in time. Actual laser sources undergo slow variations in time, therefore severely limiting the usefulness of these techniques for the compression of ultrafast pulses. As the speed of optical communication increases, the disadvantages of currently available pulse compression technologies become more and more felt. There therefore exists a critical need for a faster, more efficient, versatile pulse compressor, capable of handling arbitrary optical pulses with durations of the order of femtoseconds.

SUMMARY OF THE INVENTION

The present invention seeks to provide an improved pulse compressor, which overcomes the disadvantages and drawbacks of existing ultrashort pulse compressors, especially with respect to their application to pulses which are completely uncharacterized or partially characterized, or which originate from a laser source whose output varies with time. An improved femtosecond pulse compressor according to the present invention, has been first described by applicants in an article entitled "Adaptive ultrashort pulse compression and shaping" published in Optics Communications, Vol. 138, pp. 345–348 (June 1997), and experimental results obtained with such a pulse compressor have been reported by applicants in an article entitled "Adaptive femtosecond pulse compression", published in Optics Letters, Vol. 22, pp. 1793–1795 (Dec. 1997). These articles, as well as the disclosures of all publications mentioned in this section and in the other sections of the specification, and the disclosures of all documents cited in any of those publications, are hereby incorporated by reference.

The femtosecond pulse compressor according to the present invention uses an adaptive technique. The use of adaptive control for pulse shaping was first suggested by R. S. Judson and H. Rabitz, in their article entitled "Teaching lasers to control molecules", published in Physical Review Letters, Vol. 68, p. 1500 (1992), and later by A. M. Weiner in his extensive review article entitled "Femtosecond optical pulse shaping and processing", published in Progress in Quantum Electronics, Vol. 19, pp. 161–237 (1995). In those articles, however, the authors suggest using the adaptive procedure for pulse shaping only, such pulse shaping being used, for instance, in optimizing the yield of laser induced chemical reactions. No suggestion was made anywhere in these articles to use an adaptive technique for pulse compression, for use, for instance, in optical communication networks.

There is thus provided in accordance with a preferred embodiment of the present invention, an adaptive pulse compressor, especially for use with ultrashort pulses, wherein the input pulses are modified in an iterative fashion, according to a feedback signal obtained from measurement of the output pulses. The feedback signal is derived from any measured property of the output pulse that increases with the intensity of the pulse as it is compressed. Any non-linear property may be used as the phenomenon from which to derive this feedback signal, such as the generation of a second harmonic signal from the pulse by means of a non-linear crystal. This feedback signal is used with a suitable optimization algorithm to control the spectral components of the incoming pulses, so as to maximize the intensity of the output pulse, and hence to provide maximum compression. The control is performed by means of a programmable spatial light modulator, such that almost arbitrary phase functions can be realized to accomplish efficient compression. The adaptive femtosecond pulse compressor according to the present invention, thus removes one of the main disadvantages associated with prior art pulse compressors, namely, the need for characterization of the uncompressed pulses. Thus, the use of the adaptive technique in this invention, together with the ability to form almost arbitrary spectral phase and/or amplitude filtering, allows the efficient and versatile compression of arbitrary pulses.

Additional important benefits arise from the use of adaptive pulse compression. For example, the adaptive scheme can be used not only to compress pulses, but also to correct for slow variations of the laser source. Another benefit arises from the fact that once the optimal filter has been calculated as a result of the compression process, this filter essentially provides a measurement of the spectral phase of every component of the original pulse. This data, together with the power spectrum, allows for full characterization of the pulses.

There is further provided in accordance with another preferred embodiment of the present invention, an adaptive femtosecond pulse compressor, including an adaptive optical pulse compressor for compressing input pulses into output pulses of shorter duration, the input pulses being modified by an iterative procedure according to a feedback signal obtained from a measurement of the output pulses.

In accordance with yet another preferred embodiment of the present invention, there is provided an adaptive optical pulse compressor as described above, and wherein the input pulses are either uncharacterized or partially characterized, or where the input pulses are time varying.

In accordance with a further preferred embodiment of the present invention, there is also provided an adaptive optical pulse compressor as described above, and wherein the iterative procedure uses an optimization algorithm, which may preferably be a simulated annealing optimization procedure.

In accordance with still another preferred embodiment of the present invention, there is provided an adaptive optical pulse compressor as described above, and wherein the iterative procedure is an optimization algorithm with constraints as to the range of dispersion coefficients to be used in the Taylor expansion expressing the input pulse characteristics.

There is further provided in accordance with yet another preferred embodiment of the present invention, an adaptive optical pulse compressor as described above, and wherein the input pulses have durations of the order of femtoseconds.

There is further provided in accordance with still another preferred embodiment of the present invention, an adaptive optical pulse compressor for compressing input pulses into output pulses of shorter duration, including a programmable pulse shaper, optical apparatus for providing a feedback signal dependent on the intensity of the output pulses, and a computing system operative to control the programmable pulse shaper according to the feedback signal.

There is further provided in accordance with yet another preferred embodiment of the present invention, an adaptive optical pulse compressor as described above, and wherein the programmable pulse shaper includes an input dispersive device for spatially separating frequency components of the input pulse, a programmable spatial light modulator, a focusing element for focusing the spatially separated frequency components onto the programmable spatial light modulator, a focusing element for collimating the spatially separated frequency components after transmission through the programmable spatial light modulator, and an output dispersive device for recombining the spatially separated frequency components outputted from the programmable spatial light modulator.

There is provided in accordance with still a further preferred embodiment of the present invention, an adaptive optical pulse compressor as described above, and wherein at least one of the input and output dispersive devices is a holographic grating, a ruled grating or a prism.

There is even further provided in accordance with a preferred embodiment of the present invention, an adaptive optical pulse compressor as described above, and wherein at least one of the focusing elements is a lens or a mirror, or wherein at least one of the dispersive devices is also operative as a focusing element.

There is also provided in accordance with a further preferred embodiment of the present invention, an adaptive optical pulse compressor as described above, and wherein the programmable spatial light modulator is operative to control at least the phase of the individual spatially separated frequency components of the input pulse.

In accordance with yet another preferred embodiment of the present invention, there is provided an adaptive optical pulse compressor as described above, and wherein the feedback signal is a non-linear measurement of the output pulse.

In accordance with a further preferred embodiment of the present invention. there is also provided an adaptive optical pulse compressor as described above, and wherein the optical apparatus for providing a feedback signal dependent on the intensity of the output pulses comprises a harmonic generator and a photo-detector.

In accordance with still another preferred embodiment of the present invention, there is provided an adaptive optical pulse compressor as described above, and wherein the harmonic generator is a second harmonic generator, which may be a non-linear crystal.

There is further provided in accordance with yet another preferred embodiment of the present invention, an adaptive optical pulse compressor as described above, and wherein the optical apparatus for providing a feedback signal dependent on the intensity of the output pulses comprises apparatus for providing a multi-photon fluorescence output signal and a photo-detector.

There is further provided in accordance with still another preferred embodiment of the present invention, an adaptive optical pulse compressor as described above, and wherein the multi-photon fluorescence output signal is a two-photon fluorescence output signal.

There is provided in accordance with still a further preferred embodiment of the present invention, an adaptive optical pulse compressor as described above, operative to correct for distortion in the output pulses of a laser or a laser amplifier chain.

There is also provided in accordance with a further preferred embodiment of the present invention, an adaptive optical pulse compressor as described above, operative to provide dispersion compensation in an optical data communication channel.

BRIEF DESCRIPTION OF THE DRAWINGS

The present invention will be understood and appreciated more fully from the following detailed description, taken in conjunction with the drawings, in which:

FIGS. 2A and 2B show interferometric autocorrelation traces of the uncompressed and compressed pulses. FIG. 2A shows the uncompressed 80 fs pulses, as obtained directly from the Ti:Sapphire laser source. The power spectrum is shown in the inset. FIG. 2B shows the resulting compressed pulses after 1000 iterations. The pulses are observed to be compressed down to 14 fs.

DETAILED DESCRIPTIONS OF PREFERRED EMBODIMENTS

Figure 1:
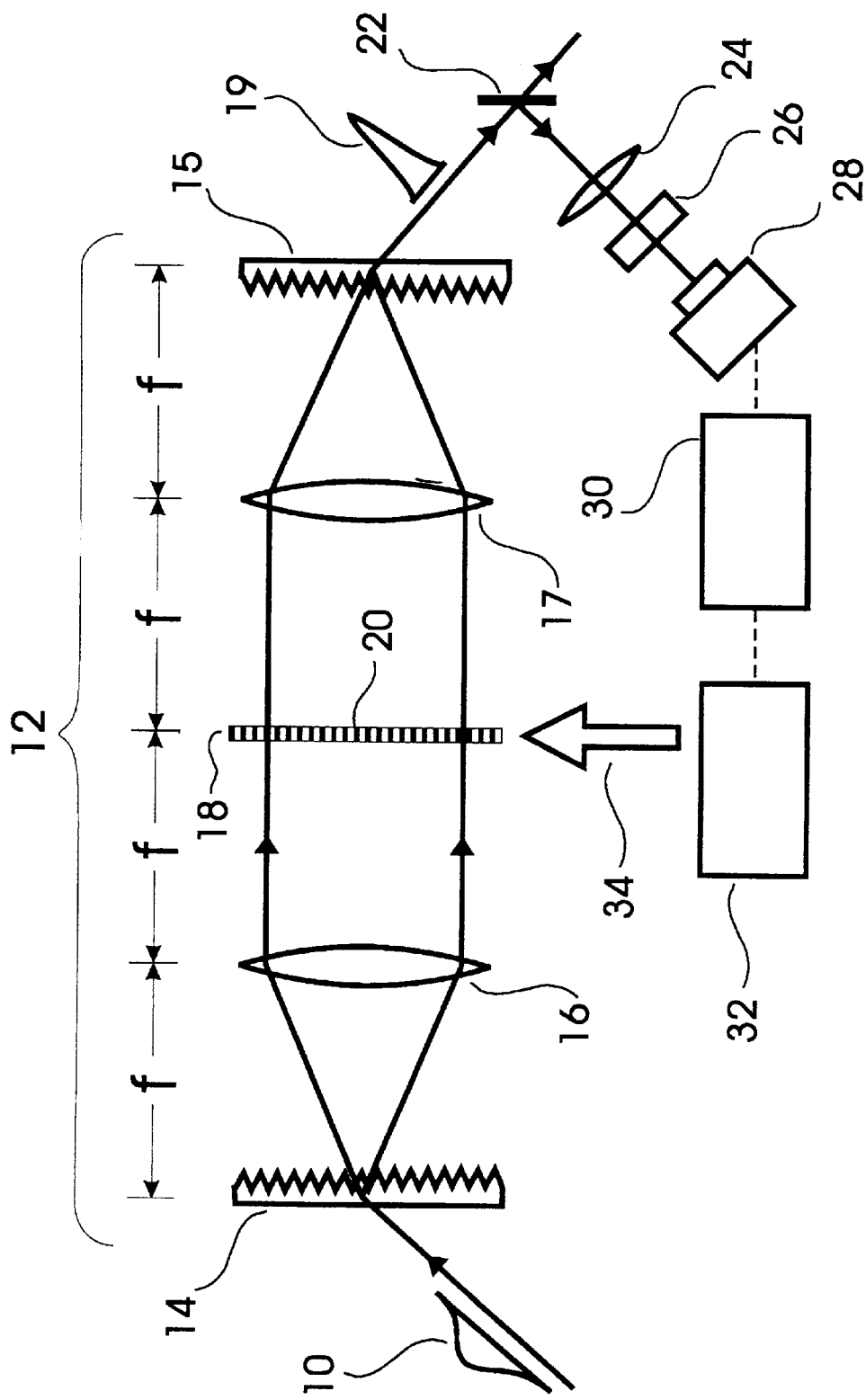
FIG. 1 is a schematic view of an adaptive femtosecond pulse compressor, constructed according to the present invention, showing the component parts of the system. A non-dispersive 4-f pulse shaper is used, and the feedback signal is taken from the second harmonic signal of the output pulse.

Reference is now made to FIG. 1 which is a schematic view of an adaptive femtosecond pulse compressor, constructed and operative according to a preferred embodiment of the current invention. The pulse to be compressed 10 is inputted to a non-dispersive 4-f pulse shaper 12 of the type described by A. M. Weiner, D. E. Leaird, J. S. Patel, and J. R. Wullert in their articles in Optics Letters, Vol. 15, p. 326 (1990), and in the IEEE Journal of Quantum Electronics, Vol. 28, p. 908 (1992). This pulse shaper is comprised of a pair of dispersive elements 14, 15, and a pair of focussing elements 16, 17, with a programmable one-dimensional liquid crystal Spatial Light Modulator array 18 (Model SLM-256, manufactured by CRI Incorporated of Boston, Mass.) located at the Fourier plane of the focal elements. This Spatial Light Modulator (SLM) has polarizers acting as half wave plates on either side of the liquid crystal elements, in order to ensure the correct polarization of the light for the most effective operation both of the gratings and of the liquid crystal element itself. In this preferred embodiment, the dispersive elements 14, 15 are thin holographic transmission gratings with 400 lines/mm, and the focussing elements 16, 17 are achromat lenses, each having a focal length of 100 mm.

The operation of the 4-f pulse shaper is as follows. After passing through the first grating 14, the frequency components that make up the incident pulse are spread out into spatially different positions. The input lens 16 focuses each of these frequency components to its specific position at the focal plane, where the SLM 18 is located. The SLM is operative as an updatable filter for spectral manipulation of the incoming pulses. This SLM allows the independent control of the phase and amplitude for each of its 128 pixels 20, thereby modifying the output pulse shape and temporal profile according to the desired pulse properties. The width of each pixel 20 is 97 $\mu$m, the inter-pixel gap is 3 $\mu$m, while the spot size at the focal plane is about 80 $\mu$m. The output lens 17 and output grating 15 then recombine each of the separate frequency components to produce the output pulse 19.

Though the above embodiment uses thin holographic transmission gratings 14, 15 at the input and output of the pulse shaper to spatially disperse and recombine the various frequency components of the pulses, it should be pointed out that any suitable dispersive elements can be used, such as ruled gratings, reflective gratings, or prisms, or combinations of them.

Furthermore, the function of the lenses 16, 17 in defining the system Fourier plane at which the SLM 18 is located, can be fulfilled by any other element having positive focusing power, such as a concave mirror.

The 4-f pulse shaper used in the above described embodiment is only one of the possible pulse shapers that can be used in the adaptive pulse compressor of the present invention. According to further preferred embodiments of the present invention, any suitable dynamic programmable pulse compressor may be used, such as that which uses an acousto-optic cell as the spatial light modulator, as described by C. W. Hillegas, J. X. Tull, D. Goswami, D. Strickland and W. S. Warren in their article in Optics Letters, Vol. 19, p. 737 (1994) entitled "Femtosecond laser pulse shaping by use of microsecond radio frequency pulses".

A sample of the output pulse 19, for use as the feedback signal, is obtained by means of a beam splitter 22. Though the beam splitter shown in FIG. 1 uses the reflected component as the sample beam, and the transmitted signal as the output beam, it is understood that the invention will operate just as well if these roles are reversed, provided that the correct signal levels for each function are maintained. As an alternative to a beam splitter, it is possible to use a gated mirror shutter, whereby the mirror reflects all of the signal into the feedback path while the iteration is in progress, and on achieving the desired compression level, the mirror is moved to an alternative position, whereby the compressed pulse is outputted.

The sample is focused using a lens 24 of focal length 50 mm, onto a 100 $\mu$m thick frequency-doubling BBO non-linear crystal 26. The second harmonic signal generated within the frequency doubler is detected by a photomultiplier 28, from which the electronic signal is fed to a lock-in amplifier 30. The phase detected signal is inputted by means of a cable 34 to a computer 32, which is programmed to calculate the spectral filter and to update the SLM status accordingly.

In the general case of pulse compression, where the input pulses are completely uncharacterized, efficient compression is accomplished by use of a modified simulated annealing optimization procedure for maximizing such a single-value feedback signal. According to this invention, any optimization algorithm can be used to accomplish convergence of the pulse to its optimum temporal shape. Various specific algorithms that have been proposed, such as the genetic algorithms or the evolutionary strategies proposed by Baumert et al. in their article "Femtosecond pulse shaping by an evolutionary algorithm with feedback", published in Applied Physics B, Vol. 63, pp. 779–782 (Dec. 1997). The differences between the various algorithms proposed only causes the process to converge after more or less iterations, depending on the efficiency of the algorithm for the specific process.

According to another preferred embodiment of the present invention, phase-only filtering may be used, in order to accomplish efficient spectral manipulation. At iteration i of the algorithm, the time-integrated second harmonic signal $C_i$ of the output pulses is given by $C_i = \int I_i^{(2\omega)}(t)\, dt$, where $I_i^{(2\omega)}(t)$ is the second harmonic intensity of the output pulses. Since phase-only filtering involves no energy loss, and due to the nonlinear process involved in the generation of the second harmonic pulses, high level feedback signals correspond to high peak pulses of short duration. Although this feedback signal cannot provide full information about the shape of the pulses, it has been verified numerically by D. Meshulach et al. in op. cit., that for a variety of pulses, such a feedback signal is effective for efficient compression. In order to carry out the adaptive compression process, a modified simulated annealing algorithm, which involves maximization of this feedback signal, may be used. At each iteration, a random change to the spectral filter is applied, the feedback signal is measured, and a decision is taken whether to accept this change.

The above embodiment has been described using the second harmonic signal as the feedback signal. According to further preferred embodiments of the present invention, the feedback signal can be taken from any physical phenomenon whose output is a function of the pulse intensity, such as higher order harmonics of the output pulse, or multi-photon fluorescence effects of the output pulse.

Since the adaptive compression used in the pulse compressor according to the present invention is accomplished by maximization of the feedback signal, this method accounts not only for the spectral phase of the input pulses, but also for any other phase distortions induced in the compressor, such as residual dispersion of the shaper, the mirrors and the SLM itself Once an optimal phase function has been found, it provides an indirect measurement of all of these phase distortions. Therefore, although the compressor is operative for pulses having smooth spectral phase variations, such as those emerging directly from lasers, based on the performance of programmable pulse shapers, such as those described by A. M. Weiner in op. cit., by D. Meshulach et al. in op. cit., and by M. M. Wefers, and K. A. Nelson, in Optics Letters, Vol. 20, p. 1047ff (1995), it is believed that the technique also has the potential to compensate for almost arbitrary spectral phase distortions.

On the other hand, we note that the SLM imposes several limitations on the overall performance. Since spectral manipulation is accomplished by control over 128 discrete pixels, continuous filters cannot be realized. In addition, some modulation of the power spectrum is present, due to residual amplitude modulation in the SLM. Consequently, true phase modulation is not achieved. These difficulties, associated with the pixelization of the filter and the residual amplitude modulation, set limitations on the overall performance of the adaptive pulse compressor according to the present invention, as is shown in the measurements discussed hereinunder.

In order to demonstrate the operation of an adaptive pulse compressor according to the present invention, some measurements were made on an experimental compressor constructed and operative according to the above mentioned preferred embodiment. The femtosecond pulse source used was a mode-locked Ti:Sapphire laser, where intracavity dispersion is compensated for by a prism-pair arrangement, followed by a second prism-pair, external to the cavity, as described by F. Krausz, Ch. Spielmann, T. Brabec, E. Wintner, and A. J. Schmidt, in the article "Generation of 33 fs pulses from a solid state laser" published in Optics Letters, Vol. 17, p. 204 (1992). This laser normally produces pulses of sub-20 fs duration.

Figure 2A:
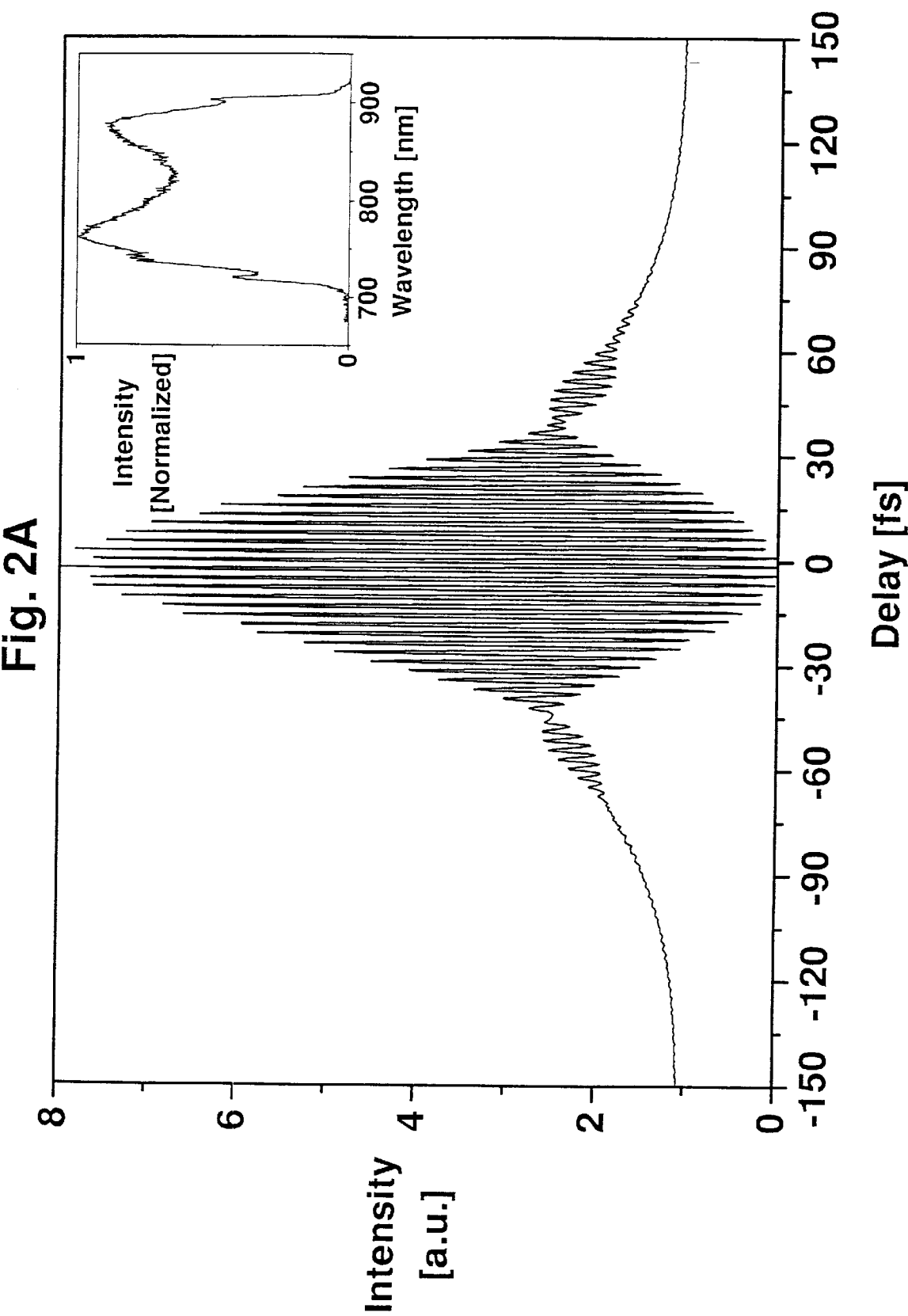

To exploit the full potential of adaptive compression of pulses obtained directly from a laser, the laser was adjusted to produce a wide spectrum, as shown in the inset of FIG. 2A. In this case, as is generally the case for mode-locked Ti:Sapphire lasers with intracavity prism-pair arrangements, the pulses obtained were far from transform limited. FIG. 2A illustrates an interferometric autocorrelation measurement of the pulses from the laser, and implies strongly chirped pulses of 80 fs FWHM. The inset graph shows the power spectrum of the pulse.

On closing the feedback loop, adaptive compression is obtained, and the increase of the second-harmonic signal is monitored as the process progresses. Interferometric autocorrelation measurements of the compressed pulses are shown in FIG. 2B. In this case, the optimization was performed using a modified simulated annealing algorithm with 1000 iterations. On comparing this result with the measurement of the uncompressed pulse shown in FIG. 2A, it is observed that the 80 fs input pulses are compressed down to 14 fs. The difference in the time scale between the two figures should be noted.

Figure 3:
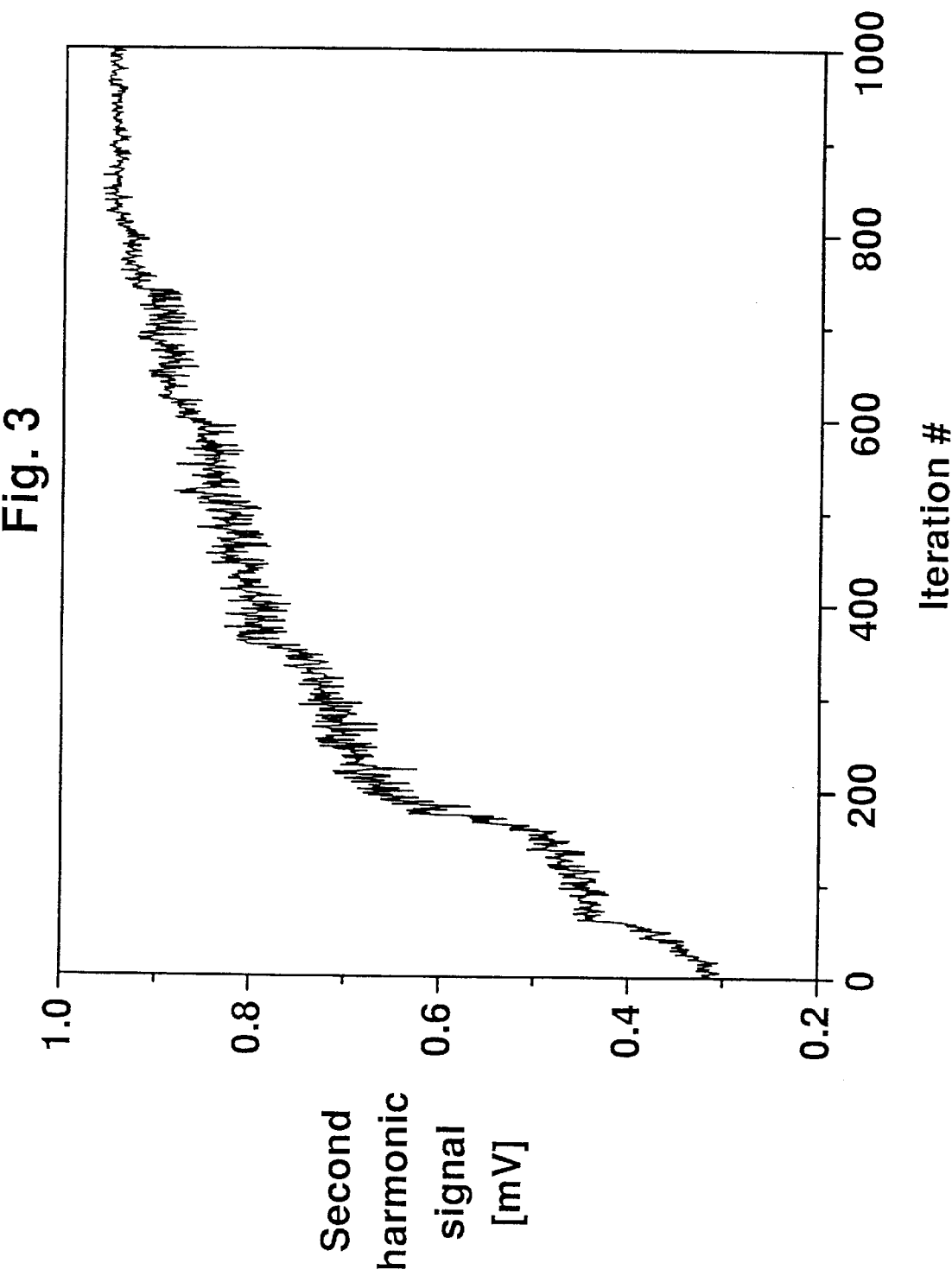
FIG. 3 is a plot of the second harmonic feedback signal in mV, as a function of the iteration number, when a modified simulated annealing algorithm is used for compression.

FIG. 3 shows the feedback signal in each iteration used to obtain the result shown in FIG. 2B. The second harmonic power increased by a factor of about 3 as a result of the optimization process. Since the pulses were compressed by a factor of about 5.7, a similar increase in the second harmonic signal would have been expected. This difference may be attributed to some energy loss in the SLM during the process, and to some residual negative dispersion of the shaper. The rapid variations in the feedback signal are not noise, but are due to the search procedure of the algorithm. In other demonstrations, pulses were compressed down to 17 fs and 13 fs after 500 and 2000 iterations, respectively. This suggests a trade-off between the number of iterations and the duration of the resulting compressed pulses. It is noted that a relatively small number of iterations is needed for optimization of 128 independent phase terms, this form of convergence being typical for the compressor according to the present invention.

The modified simulated annealing algorithm proposed does not make use of any information about the uncompressed pulses, but simply maximizes the feedback signal by any suitable optimization procedure. This is what gives the pulse compressor according to the present invention its unique advantage, namely of being able to operate on any uncharacterized input pulse. If, however, some information on the input pulses is available, it can be used to improve the optimization procedure. For example, this could be the case where the pulses exhibit dispersion which can be approximated by the leading terms of the corresponding Taylor expansion. In this case, an optimization algorithm for adaptive compression based on a search in the two-dimensional space of second and third order dispersion coefficients can be used to improve the results. Therefore, according to another preferred embodiment of the present invention, the pulse compressor may utilize an optimization algorithm with built in constraints as to the range of dispersion coefficients to be used in the Taylor expansion expressing the input pulse characteristics.

Since most of the dispersion in an arbitrary input pulse usually arises from the first 3 or 4 terms of the Taylor expansion of the dispersion relationship, it is generally sufficient to use no more than these first few terms in the optimization algorithm.

Figure 4:
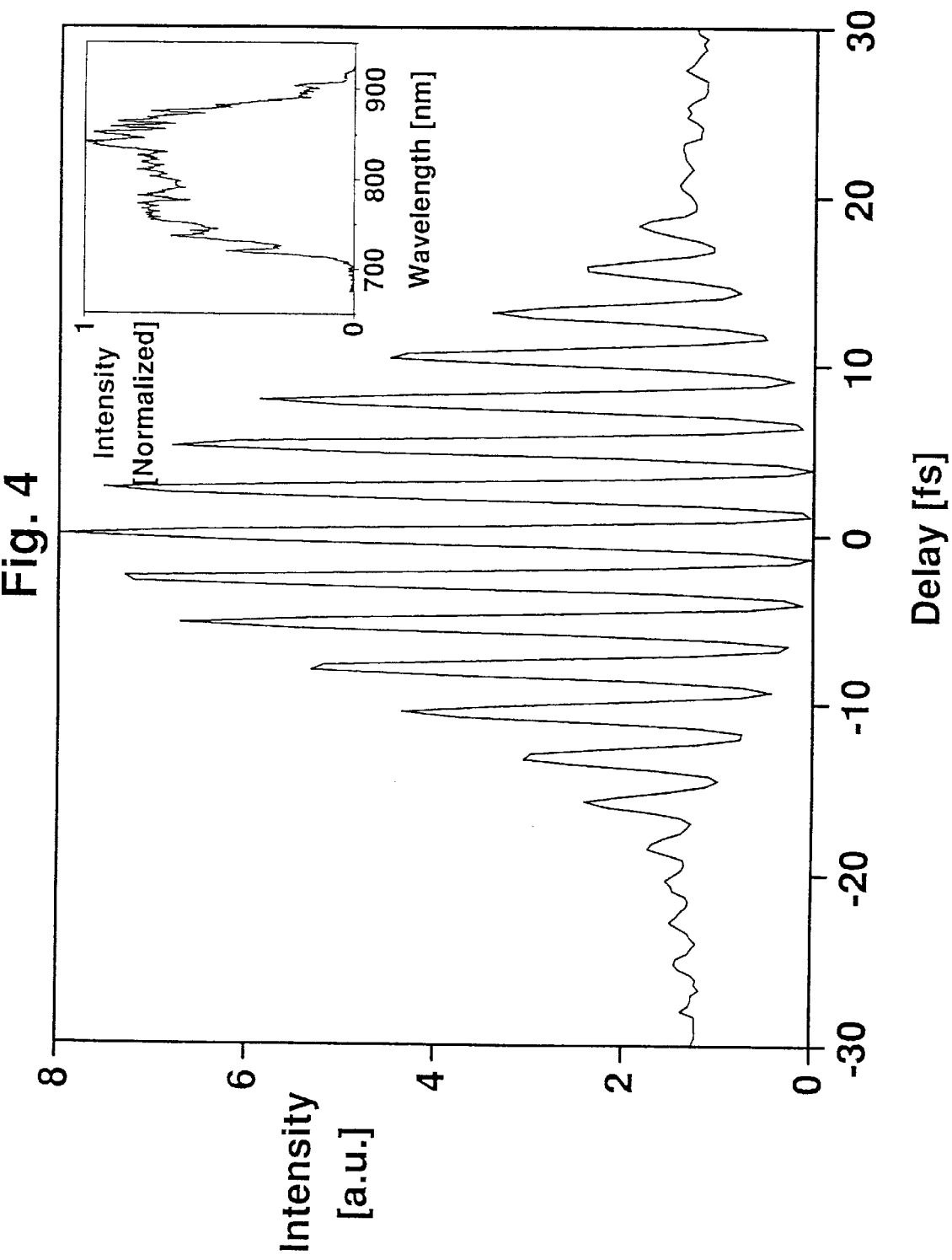
FIG. 4 shows an interferometric autocorrelation trace of the compressed pulses, obtained using a two-dimensional search algorithm for second and third order dispersion coefficients only, after 1200 iterations. The pulses are observed to be compressed down to 11 fs. The output pulse power spectrum is shown in the inset.

FIG. 4 shows an interferometric autocorrelation measurement of the compressed pulses obtained from those in FIG. 2A, by using such a constrained algorithm. The algorithm used was a two-dimensional search algorithm for second and third order dispersion coefficients, and the result is shown after 1200 iterations. From FIG. 4, it can be calculated that the pulses are compressed down to 11 fs. A direct Fourier transformation of the input spectrum in the absence of any phase modulation indicates that the spectrum can support a pulse as short as 9 fs. This result suggests that the input laser pulses are indeed chirped primarily by second and third order terms of the spectral phase. The inset graph shows the output power spectrum of the pulse.

An inspection of the inset graph of FIG. 4 demonstrates one of the limitations on the overall performance of the adaptive pulse compressor constructed, as discussed hereinabove. Some modulation of the power spectrum is observed, due to residual amplitude modulation in the SLM. Consequently, true phase modulation was not achieved. This is not, however, a fundamental limitation of the performance of the compressor.

The adaptive pulse compressor according to the present invention can also be used even when the pulse source undergoes slow variations in time, if the period of change is long compared with the time required to perform a complete compression, as discussed above. It is also possible to provide features in the optimization algorithm which detects sudden changes in the pulse form of the laser output, and to compensate for them in the optimization procedure.

There are a number of applications for the adaptive pulse compressor of the present invention. All of these applications and others, are possible only because the pulse compressor of the present invention operates without the need to know the form of the pulse being compressed. One such application is the improvement of the spectral characteristics of lasers, to correct for phase distortions in the output pulses. The narrowest pulse will give the transform limited pulse shape, and the addition of a pulse compressor according to the present invention to the output of a short-pulse laser will enable the laser to achieve such pulse improvement.

A further and important application is in the field of optical communication, in order to provide dispersion compensation in transmission channels. As a result of the group-velocity dispersion and the polarization mode dispersion present in the transmission link, the pulses of data become distorted, and hence widen in the temporal frame. The adaptive pulse compressor of the present invention is able to restore the original form of the pulse, without the need to know the form of the distortion.

Figure 5:
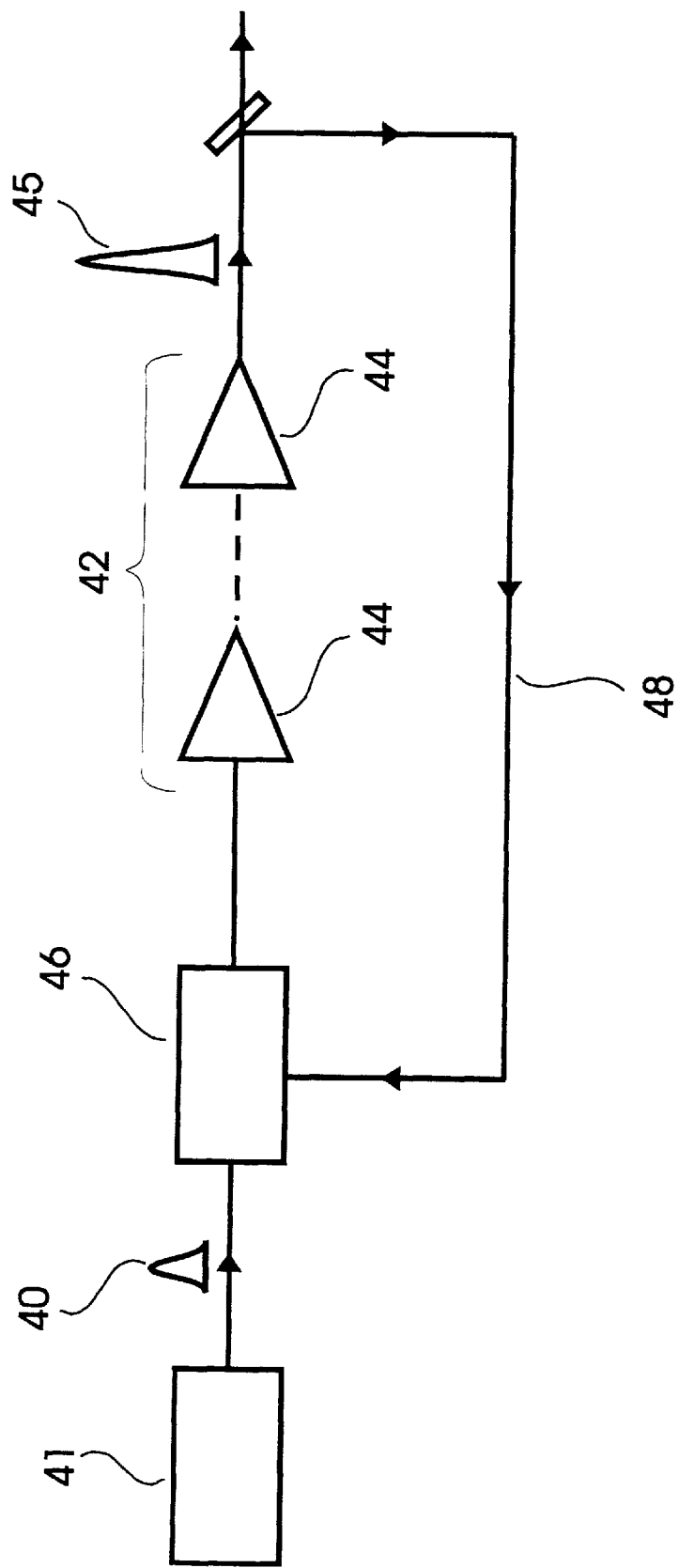
FIG. 5 is a schematic drawing of a multi-stage laser oscillator/amplifier chain, utilizing an adaptive pulse compressor according to the present invention to precompensate for phase and/or amplitude distortion of the output pulses, introduced by the amplifier chain.

Another potential application arises in the production of high power ultrashort laser pulses. FIG. 5 illustrates schematically such a system. Low power, ultrashort laser pulses 40 are produced by a laser oscillator 41. These pulses are amplified by means of an amplifier chain 42, which consists of one or more stages of individual amplifiers 44. Since the amplifiers are not perfectly linear, each imparts some level of phase and/or amplitude distortion to its input pulse, as a result of which, the pulse broadens. The high power amplified output pulse 45 can be restored to a shape close to that of the oscillator output, by precompensating the input pulse to the amplifier chain by means of an adaptive pulse compressor 46, according to the present invention. The pulse compressor uses a sample of the final output pulse as the feedback signal 48 which is optimized by the algorithm used.

It will be appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. An adaptive optical pulse compressor, comprising:

an input port for receiving an input pulse;

an output port for delivering an output pulse, said output pulse being obtained by compression of said input pulse;

an optical pulse measurement device for determining the intensity of said output pulse; and a pulse shaper for modifying said input pulse by means of an iterative procedure, according to a feedback signal obtained from said intensity of said output pulse;

wherein said iterative procedure is an optimization algorithm with constraints as to the range of dispersion coefficients to be used in the Taylor expansion expressing the input pulse characteristics.

2. An adaptive optical pulse compressor, comprising:

an input port for receiving an input pulse having a duration of the order of femtoseconds;

an output port for delivering an output pulse, said output pulse being obtained by compression of said input pulse;

an optical pulse measurement device for determining the intensity of said output pulse; and a pulse shaper for modifying said input pulse by means of an iterative procedure, according to a feedback signal obtained from said intensity of said output pulse.

3. An adaptive optical pulse compressor for compressing input pulses into output pulses of shorter duration, comprising;

a programmable pulse shaper;

optical apparatus for providing a feedback signal dependent on the intensity of said output pulses; and a computing system operative to control the programmable pulse shaper according to said feedback signal;

wherein said programmable pulse shaper comprises:

an input dispersive device for spatially separating frequency components of said input pulse;

a programmable spatial light modulator;

a focusing element for focusing said spatially separated frequency components onto said programmable spatial light modulator;

a focusing element for collimating said spatially separated frequency components after transmission through said programmable spatial light modulator; and an output dispersive device for recombining said spatially separated frequency components outputted from said programmable spatial light modulator.

4. An adaptive optical pulse compressor according to claim 3, and wherein at least one of said input and output dispersive devices is a holographic grating.

5. An adaptive optical pulse compressor according to claim 3, and wherein at least one of said input and output dispersive devices is a ruled grating.

6. An adaptive optical pulse compressor according to claim 3, and wherein at least one of said input and output dispersive devices is a prism.

7. An, adaptive optical pulse compressor according to claim 3, and wherein at least one of said focusing elements is a lens.

8. An adaptive optical pulse compressor according to claim 3, and wherein at least one of said focusing elements is a mirror.

9. An adaptive optical pulse compressor according to claim 3, and wherein at least one of said dispersive devices is also operative as a focusing element.

10. An adaptive optical pulse compressor according to claim 3, and wherein said programmable spatial light modulator is operative to control at least the phase of said individual spatially separated frequency components of said input pulse.

11. An adaptive optical pulse compressor according to claim 3, and wherein said feedback signal is a non-linear measurement of the output pulse.

12. An adaptive optical pulse compressor according to claim 3, and wherein said optical apparatus for providing a feedback signal dependent on the intensity of said output pulses comprises a harmonic generator and a photo-detector.

13. An adaptive optical pulse compressor according to claim 12, and wherein said harmonic generator is a second harmonic generator.

14. An adaptive optical pulse compressor according to claim 13, and wherein said second harmonic generator is a non-linear crystal.

15. An adaptive optical pulse compressor according to claim 3, and wherein said optical apparatus for providing a feedback signal dependent on the intensity of said output pulses comprises apparatus for providing a multi-photon fluorescence output signal and a photo-detector.

16. An adaptive optical pulse compressor according to claim 15, and wherein said multi-photon fluorescence output signal is a two-photon fluorescence output signal.

17. An adaptive optical pulse compressor according to claim 3, operative to correct for distortion in the output pulses of a laser.

18. An adaptive optical pulse compressor according to claim 3, operative to provide dispersion compensation in an optical data communication channel.

19. An adaptive optical pulse compressor according to claim 3, operative to correct for distortion in a laser amplifier chain.

* * * * *